US012680814B2

(12) United States Patent
Savchenko et al.

(10) Patent No.: US 12,680,814 B2
(45) Date of Patent: Jul. 14, 2026

(54) QUADRATURE TRIM VERTICAL ELECTRODES FOR YAW AXIS CORIOLIS VIBRATORY GYROSCOPE

(71) Applicant: Analog Devices, Inc., Wilmington, MA (US)

(72) Inventors: Arthur Y. Savchenko, Andover, MA (US); Igor P. Prikhodko, Buzzards Bay, MA (US); Tyler Adam Dunn, Westford, MA (US)

(73) Assignee: Analog Devices, Inc., Wilmington, MA (US)

( * ) Notice: Subject to any disclaimer, the term of this patent is extended or adjusted under 35 U.S.C. 154(b) by 518 days.

(21) Appl. No.: 18/135,098

(22) Filed: Apr. 14, 2023

(65) Prior Publication Data

US 2023/0332890 A1     Oct. 19, 2023

Related U.S. Application Data

(60) Provisional application No. 63/332,138, filed on Apr. 18, 2022.

(51) Int. Cl.
*G01C 19/5712* (2012.01)

(52) U.S. Cl.
CPC ................................. *G01C 19/5712* (2013.01)

(58) Field of Classification Search
CPC ............ G01C 19/5712; G01C 19/5733; G01C 19/5726; G01C 19/5656
See application file for complete search history.

(56) References Cited

U.S. PATENT DOCUMENTS

| | | | |
|---|---|---|---|
| 5,241,861 | A | 9/1993 | Hulsing, II |
| 5,392,650 | A | 2/1995 | O'Brien et al. |
| 5,600,064 | A | 2/1997 | Ward |
| 5,635,638 | A | 6/1997 | Geen |
| 5,869,760 | A | 2/1999 | Geen |
| 6,230,563 | B1 | 5/2001 | Clark et al. |
| 6,257,059 | B1 | 7/2001 | Weinberg et al. |
| 6,370,937 | B2 | 4/2002 | Hsu |
| 6,505,511 | B1 | 1/2003 | Geen et al. |
| 6,571,630 | B1 | 6/2003 | Weinberg et al. |

(Continued)

FOREIGN PATENT DOCUMENTS

| | | |
|---|---|---|
| CN | 1559882 A | 1/2005 |
| CN | 101160506 A | 4/2008 |

(Continued)

OTHER PUBLICATIONS

Extended European Search Report dated Sep. 22, 2023 in connection with European Application No. 23168285.7.

(Continued)

*Primary Examiner* — David J Bolduc
(74) *Attorney, Agent, or Firm* — Schwegman Lundberg & Woessner, P.A.

(57) ABSTRACT

Microelectromechanical systems (MEMS) yaw gyroscopes having out-of-plane quadrature trim electrodes are described. The gyroscope includes a proof mass configured to be driven in-plane. The proof mass includes an opening, or a plurality of openings. The out-of-plane quadrature trim electrodes are positioned to laterally overlap edges of the opening in a projection plane. The out-of-plane quadrature trim electrodes trim in-plane motion of the proof mass in one or two directions to limit quadrature motion. The out-of-plane quadrature trim electrodes may be arranged in a symmetric pattern to enable mode switching.

19 Claims, 11 Drawing Sheets

(56) References Cited

U.S. PATENT DOCUMENTS

| 6,705,164 | B2 | 3/2004 | Willig et al. |
| 6,752,017 | B2 | 6/2004 | Willig et al. |
| 6,845,668 | B2 | 1/2005 | Kim et al. |
| 6,860,151 | B2 | 3/2005 | Platt et al. |
| 6,877,374 | B2 | 4/2005 | Geen |
| 6,883,361 | B2 | 4/2005 | Wyse |
| 7,032,451 | B2 | 4/2006 | Geen |
| 7,036,373 | B2 | 5/2006 | Johnson et al. |
| 7,204,144 | B2 | 4/2007 | Geen |
| 7,222,533 | B2 | 5/2007 | Mao et al. |
| 7,227,432 | B2 | 6/2007 | Lutz et al. |
| 7,231,824 | B2 | 6/2007 | French et al. |
| 7,284,429 | B2 | 10/2007 | Chaumet et al. |
| 7,287,428 | B2 | 10/2007 | Green |
| 7,313,958 | B2* | 1/2008 | Willig ............... G01C 19/5747 |
| | | | 73/504.12 |
| 7,347,094 | B2 | 3/2008 | Geen et al. |
| 7,421,897 | B2 | 9/2008 | Geen et al. |
| 7,444,868 | B2 | 11/2008 | Johnson |
| 7,675,217 | B2 | 3/2010 | Delevoye et al. |
| 7,984,648 | B2 | 7/2011 | Horning et al. |
| 8,096,181 | B2 | 1/2012 | Fukomoto |
| 8,210,039 | B2 | 7/2012 | Rudolf et al. |
| 8,266,961 | B2 | 9/2012 | Kuang et al. |
| 8,322,213 | B2 | 12/2012 | Trusov et al. |
| 8,342,023 | B2 | 1/2013 | Geiger |
| 8,354,900 | B2 | 1/2013 | Cazzaniga et al. |
| 8,453,504 | B1 | 6/2013 | Mao |
| 8,490,483 | B2 | 7/2013 | Wrede et al. |
| 8,534,127 | B2* | 9/2013 | Seeger ............... G01C 19/5712 |
| | | | 73/514.32 |
| 8,539,832 | B2 | 9/2013 | Potasek et al. |
| 8,656,776 | B2 | 2/2014 | Trusov et al. |
| 8,783,103 | B2 | 7/2014 | Clark et al. |
| 8,783,105 | B2 | 7/2014 | Kuhlmann et al. |
| 8,794,067 | B2 | 8/2014 | Schmid et al. |
| 8,844,357 | B2 | 9/2014 | Scheben et al. |
| 8,852,984 | B1* | 10/2014 | Quevy ................. B81B 3/0062 |
| | | | 438/48 |
| 8,991,247 | B2 | 3/2015 | Trusov et al. |
| 9,207,081 | B2 | 12/2015 | Geen |
| 9,212,908 | B2 | 12/2015 | Geen et al. |
| 9,217,756 | B2 | 12/2015 | Simon et al. |
| 9,493,340 | B2 | 11/2016 | Mahameed et al. |
| 9,534,896 | B2 | 1/2017 | Sutton et al. |
| 9,726,491 | B2* | 8/2017 | Stewart .............. G01C 19/5705 |
| 9,891,053 | B2 | 2/2018 | Seeger et al. |
| 10,060,757 | B2 | 8/2018 | Opris et al. |
| 10,113,873 | B2 | 10/2018 | Cook et al. |
| 10,317,210 | B2 | 6/2019 | Kub et al. |
| 10,330,475 | B2 | 6/2019 | Cassagnes et al. |
| 10,415,968 | B2 | 9/2019 | Prikhodko et al. |
| 10,444,013 | B2 | 10/2019 | Prati et al. |
| 10,514,259 | B2 | 12/2019 | Jia et al. |
| 10,520,331 | B2 | 12/2019 | Weinberg et al. |
| 10,551,191 | B2 | 2/2020 | Laghi et al. |
| 10,627,235 | B2 | 4/2020 | Prikhodko et al. |
| 10,697,774 | B2 | 6/2020 | Prikhodko et al. |
| 10,746,548 | B2 | 8/2020 | Gregory et al. |
| 10,753,744 | B2 | 8/2020 | Jandak et al. |
| 10,948,294 | B2 | 3/2021 | Gregory et al. |
| 11,193,771 | B1 | 12/2021 | Gregory et al. |
| 11,614,328 | B2* | 3/2023 | Pal ............................ G01P 1/00 |
| | | | 73/504.12 |
| 2001/0039834 | A1 | 11/2001 | Hsu |
| 2003/0029238 | A1 | 2/2003 | Challoner |
| 2004/0123660 | A1 | 7/2004 | Willig et al. |
| 2004/0226369 | A1 | 11/2004 | Kang et al. |
| 2005/0284222 | A1* | 12/2005 | Johnson ............. G01C 19/5719 |
| | | | 73/504.02 |
| 2006/0213265 | A1* | 9/2006 | Weber ................. G01C 19/5719 |
| | | | 73/504.02 |
| 2006/0213266 | A1* | 9/2006 | French ............... G01C 19/5719 |
| | | | 73/504.02 |

| 2006/0230830 | A1 | 10/2006 | Geen et al. |
| 2007/0062282 | A1 | 3/2007 | Akashi et al. |
| 2008/0000296 | A1* | 1/2008 | Johnson ............. G01C 19/5719 |
| | | | 73/514.32 |
| 2008/0236280 | A1* | 10/2008 | Johnson ............. G01C 19/5726 |
| | | | 73/504.14 |
| 2008/0282833 | A1 | 11/2008 | Chaumet |
| 2009/0133495 | A1* | 5/2009 | Arakawa ........... G01C 19/5698 |
| | | | 73/504.01 |
| 2009/0223277 | A1 | 9/2009 | Rudolf et al. |
| 2009/0241662 | A1* | 10/2009 | Supino .............. G01C 19/5719 |
| | | | 73/514.32 |
| 2009/0255336 | A1* | 10/2009 | Horning ................ G01P 15/125 |
| | | | 73/504.12 |
| 2010/0313657 | A1 | 12/2010 | Trusov et al. |
| 2011/0061460 | A1* | 3/2011 | Seeger ................. G01C 19/574 |
| | | | 73/504.12 |
| 2011/0153251 | A1 | 6/2011 | Classen et al. |
| 2012/0060604 | A1 | 3/2012 | Neul et al. |
| 2012/0118062 | A1 | 5/2012 | Gunthner et al. |
| 2012/0125099 | A1 | 5/2012 | Scheben et al. |
| 2012/0210788 | A1 | 8/2012 | Günther et al. |
| 2012/0222483 | A1 | 9/2012 | Blomqvist et al. |
| 2013/0019680 | A1* | 1/2013 | Kittilsland ......... G01C 19/5712 |
| | | | 73/504.12 |
| 2013/0099292 | A1* | 4/2013 | Nakatani ........... G01C 19/5733 |
| | | | 438/51 |
| 2013/0192363 | A1 | 8/2013 | Loreck |
| 2013/0269413 | A1 | 10/2013 | Tao et al. |
| 2014/0007681 | A1* | 1/2014 | Lin .................... G01C 19/5719 |
| | | | 73/504.12 |
| 2014/0144232 | A1 | 5/2014 | Lin et al. |
| 2014/0190258 | A1 | 7/2014 | Donadel et al. |
| 2014/0260608 | A1 | 9/2014 | Lin et al. |
| 2015/0092019 | A1* | 4/2015 | Asano .................. H04N 25/587 |
| | | | 348/136 |
| 2015/0114112 | A1* | 4/2015 | Valzasina ........... G01C 19/5747 |
| | | | 73/504.12 |
| 2015/0285633 | A1 | 10/2015 | Kamal Said Abdel Aziz et al. |
| 2015/0330783 | A1 | 11/2015 | Rocchi et al. |
| 2016/0025493 | A1 | 1/2016 | Stewart |
| 2016/0097642 | A1 | 4/2016 | Okami et al. |
| 2016/0187370 | A1* | 6/2016 | Ikehashi ............. G01L 19/0618 |
| | | | 73/514.32 |
| 2016/0264404 | A1 | 9/2016 | Acar |
| 2016/0316146 | A1 | 10/2016 | Kajimura |
| 2016/0349056 | A1 | 12/2016 | Thompson et al. |
| 2017/0234684 | A1 | 8/2017 | Coronato et al. |
| 2018/0017387 | A1* | 1/2018 | Cassagnes ......... G01C 19/5755 |
| 2018/0038692 | A1* | 2/2018 | Prati ................... G01C 19/574 |
| 2018/0058853 | A1 | 3/2018 | Jia et al. |
| 2018/0172445 | A1 | 6/2018 | Prikhodko et al. |
| 2018/0172446 | A1 | 6/2018 | Prikhodko et al. |
| 2018/0172447 | A1 | 6/2018 | Prikhodko et al. |
| 2018/0252526 | A1 | 9/2018 | Geisberger |
| 2019/0072389 | A1* | 3/2019 | Prati ................... G06F 12/0817 |
| 2019/0310087 | A1 | 10/2019 | Gregory et al. |
| 2020/0011702 | A1 | 1/2020 | Clark |
| 2020/0249020 | A1 | 8/2020 | Prikhodko et al. |
| 2020/0292313 | A1* | 9/2020 | Endean .............. G01C 19/5621 |
| 2020/0400434 | A1* | 12/2020 | Guerinoni ........... G01C 19/574 |
| 2021/0278847 | A1 | 9/2021 | Prikhodko et al. |
| 2021/0285981 | A1* | 9/2021 | Rizzini .............. G01C 19/5733 |
| 2021/0381832 | A1 | 12/2021 | Prikhodko et al. |
| 2022/0057208 | A1* | 2/2022 | Prikhodko ......... G01C 19/5712 |
| 2023/0135941 | A1* | 5/2023 | Gattere .............. G01C 19/5712 |
| | | | 73/504.12 |
| 2023/0296379 | A1* | 9/2023 | Prikhodko ......... G01C 19/5712 |
| | | | 73/504.12 |

FOREIGN PATENT DOCUMENTS

| CN | 101509771 | A | 8/2009 |
| CN | 101759136 | A | 6/2010 |
| CN | 101821587 | A | 9/2010 |
| CN | 102334011 | A | 1/2012 |
| CN | 202793402 | U | 3/2013 |

(56)                    References Cited

FOREIGN PATENT DOCUMENTS

| | | | |
|---|---|---|---|
| CN | 103213934 | A | 7/2013 |
| CN | 103852073 | A | 6/2014 |
| CN | 104089612 | A | 10/2014 |
| CN | 104145185 | A | 11/2014 |
| CN | 104220840 | A | 12/2014 |
| CN | 104236535 | A | 12/2014 |
| CN | 104501792 | A | 4/2015 |
| CN | 104730289 | A | 6/2015 |
| CN | 104931032 | A | 9/2015 |
| CN | 105606083 | A | 5/2016 |
| EP | 0 902 876 | A1 | 3/1999 |
| EP | 1253399 | A1 | 10/2002 |
| EP | 4266003 | B1 | 6/2025 |
| JP | 2008-537114 | A | 9/2008 |
| JP | 2011145129 | A | 7/2011 |
| JP | 2014-510271 | A | 4/2014 |
| JP | 6027029 | B2 | 11/2016 |
| WO | WO 97/45699 | A2 | 12/1997 |
| WO | 2012/120190 | A2 | 9/2012 |
| WO | 2022/046799 | A1 | 3/2022 |

OTHER PUBLICATIONS

EP23168285.7, May 8, 2024, Communication pursuant to Article 94(3).

Kranz et al., Micromechanical vibratory rate gyroscopes fabricated in conventional CMOS. Proc. Symposium Gyro Technology. Deutsche Gesellschaft Fuer Ortung Und Navigation, 1997. Stuttgart ,Germany. Sep. 16-17; pp. 3.0-3.8.

Kranz, Design, Simulation and Implementation of Two Novel Micromechanical Vibratory-Rate Gyroscopes. Department of Electrical and Computer Engineering. Carnegie Mellon University. May 1988. 41 pages.

Kumar et al., Amplitude modulated Lorentz force MEMS magnetometer with picotesla sensitivity. Journal of Micromechanics and Microengineering. Sep. 20, 2016; 26(10): http://iopscience.iop.org/article/10.1088/0960-1317/26/10/105021/meta#fnref-jimmaa3949bib003.

Li et al., Three-Axis Lorentz-Force Magnetic Sensor for Electronic Compass Applications. Journal of Microelectromechanical Systems. Aug. 2012;21(4):1002 http://ieeexplore.ieee.org/stamp/stamp.jsp?arnumber=6198750.

Park et al., Dynamics and control of a MEMS angle measuring gyroscope. Sensors and Actuators A: Physical 144.1 (2008): 56-63.

Prikhodko et al., Foucault Pendulum on a Chip: Angle Measuring Silicon Mems Gyroscope. 2011 IEEE 24th International Conference on Micro Electro Mechanical Systems (MEMS 2011), Cancun, Mexico. Jan. 23-27, 2011;161-4.

Trusov et al., Flat Is Not Dead: Current and Future Performance of Si-MEMS Quad Mass Gyro (QMG) System. 2014 IEEE/ION Position, Location and Navigation Symposium. (PLANS 2014). May 5-8, 2014. 7 pages.

Trusov et al., Force Rebalance, Whole Angle, and Self-Calibration Mechanization of Silicon MEMS Quad Mass Gyro. IEEE 2014 International Symposium on Inertial Sensors and Systems (ISISS). Feb. 25-26, 2014;149-50.

Zaman et al., A mode-matched silicon-yaw tuning-fork gyroscope with subdegree-per-hour Allan deviation bias instability. Journal of Microelectromechanical Systems 17.6 (2008): 1526-36.

Communication pursuant to Article 94(3) EPC dated May 8, 2024 in connection with European Application No. 23168285.7.

"European Application Serial No. 23168285.7, Response filed Aug. 5, 2024 to Communication pursuant to Article 94(3) EPC mailed May 8, 2024", 12 pgs.

"European Application Serial No. 23168285.7, Response filed Dec. 20, 23 to Extended European Search Report mailed Sep. 22, 23", 18 pgs.

* cited by examiner

QUADRATURE TRIM VERTICAL ELECTRODES FOR YAW AXIS CORIOLIS VIBRATORY GYROSCOPE

CROSS-REFERENCE TO RELATED APPLICATION

This application claims the benefit under 35 U.S.C. § 119(e) of U.S. Provisional Application Ser. No. 63/332,138, entitled "QUADRATURE TRIM VERTICAL ELEC-TRODES FOR YAW AXIS CORIOLIS VIBRATORY GYROSCOPE," filed on Apr. 18, 2022, which is hereby incorporated herein by reference in its entirety.

FIELD OF THE DISCLOSURE

The present disclosure relates to quadrature trimming electrode configurations for yaw gyroscopes.

BACKGROUND

Yaw gyroscopes detect angular acceleration about a yaw axis. Some yaw gyroscopes include a proof mass that is driven in-plane along one direction and which moves in-plane along an orthogonal direction in response to rotation about the yaw axis.

SUMMARY OF THE DISCLOSURE

Microelectromechanical systems (MEMS) yaw gyro-scopes having out-of-plane quadrature trim electrodes are described. The gyroscope includes a proof mass configured to be driven in-plane. The proof mass includes an opening, or a plurality of openings. The out-of-plane quadrature trim electrodes are positioned to laterally overlap edges of the opening in a projection plane. The out-of-plane quadrature trim electrodes trim in-plane motion of the proof mass in one or two directions.

According to an aspect of the present technology, a microelectromechanical systems (MEMS) gyroscope is described, comprising: a substrate; a proof mass suspended above the substrate and comprising an enclosed opening; and out-of-plane quadrature trim electrodes on the substrate, separated from the proof mass in a direction normal to the proof mass, and laterally positioned to overlap interior edges of the proof mass at the opening.

In some embodiments, the proof mass comprises an array of openings and the MEMS gyroscope comprises an array of out-of-plane quadrature trim electrodes laterally positioned to overlap interior edges of the array of openings.

In some embodiments, the array of out-of-plane quadra-ture trim electrodes are arranged in a checkerboard pattern to receive two different voltages.

In some embodiments, the out-of-plane quadrature trim electrodes are laterally positioned along two dimensions to provide quadrature trim in two in-plane dimensions of the proof mass.

In some embodiments, the MEMS gyroscope further comprises at least one drive electrode configured to drive in-plane motion of the proof mass in a first direction.

In some embodiments, the MEMS gyroscope further comprises a controller configured to apply a direct current (DC) voltage to the out-of-plane quadrature trim electrodes and an alternating current (AC) voltage to the at least one drive electrode.

In some embodiments, a dimension of each of the out-of-plane quadrature trim electrodes is a value between 20 μm and 40 μm.

In some embodiments, a dimension of the enclosed open-ing is a value between 20 μm and 40 μm and a spacing between two adjacent electrodes of the out-of-plane trim electrodes is a value between 0.1 μm and 1.0 μm.

According to an aspect of the present technology, a microelectromechanical systems (MEMS) gyroscope is described, comprising: a planar proof mass suspended above a substrate; drive electrodes in-plane with the planar proof mass and configured to drive in-plane motion of the planar proof mass; and a pair of out-of-plane quadrature trim electrodes underlying an opening in the planar proof mass and configured to apply an in-plane quadrature trim force to the planar proof mass at the opening.

In some embodiments, the planar proof mass comprises an array of openings including the opening and the MEMS gyroscope comprises an array of out-of-plane quadrature trim electrodes including the pair of out-of-plane quadrature trim electrodes, the array of out-of-plane quadrature trim electrodes laterally positioned to overlap interior edges of the array of openings.

In some embodiments, the array of out-of-plane quadra-ture trim electrodes are laterally positioned along two dimensions to provide quadrature trim in two in-plane dimensions of the planar proof mass.

In some embodiments, the MEMS gyroscope further comprises a controller configured to apply direct current (DC) voltages to the pair of out-of-plane quadrature trim electrodes and an alternating current (AC) voltage to the drive electrodes.

According to an aspect of the present technology, a method is described of operating a microelectromechanical systems (MEMS) yaw gyroscope having a planar proof mass with an opening suspended above a pair of quadrature trim electrodes. The method comprises generating an in-plane force at the opening of the planar proof mass in a first in-plane direction by applying a first direct current (DC) voltage to the pair of quadrature trim electrodes; driving in-plane motion of the planar proof mass along the first in-plane direction; and sensing angular motion of the MEMS yaw gyroscope by sensing in-plane motion of the planar proof mass along a second in-plane direction perpendicular to the first in-plane direction.

In some embodiments, the pair of quadrature trim elec-trodes is a first pair of quadrature trim electrodes, and the MEMS yaw gyroscope further comprises a second pair of quadrature trim electrodes positioned perpendicularly to the first pair of quadrature trim electrodes, and the method further comprises: generating an in-plane force at the open-ing of the planar proof mass in the second in-plane direction by applying a second DC voltage to the second pair of quadrature trim electrodes.

In some embodiments, driving in-plane motion of the planar proof mass comprises applying an alternating current (AC) drive signal to a pair of in-plane drive electrodes.

In some embodiments, applying the DC voltage to the pair of quadrature trim electrodes comprises applying the DC voltage to a pad connected to a subset of an array of quadrature trim electrodes.

In some embodiments, driving in-plane motion of the planar proof mass does not substantially alter a gap between the planar proof mass and the pair of quadrature trim electrodes.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

I. Overview

Figure 1A:
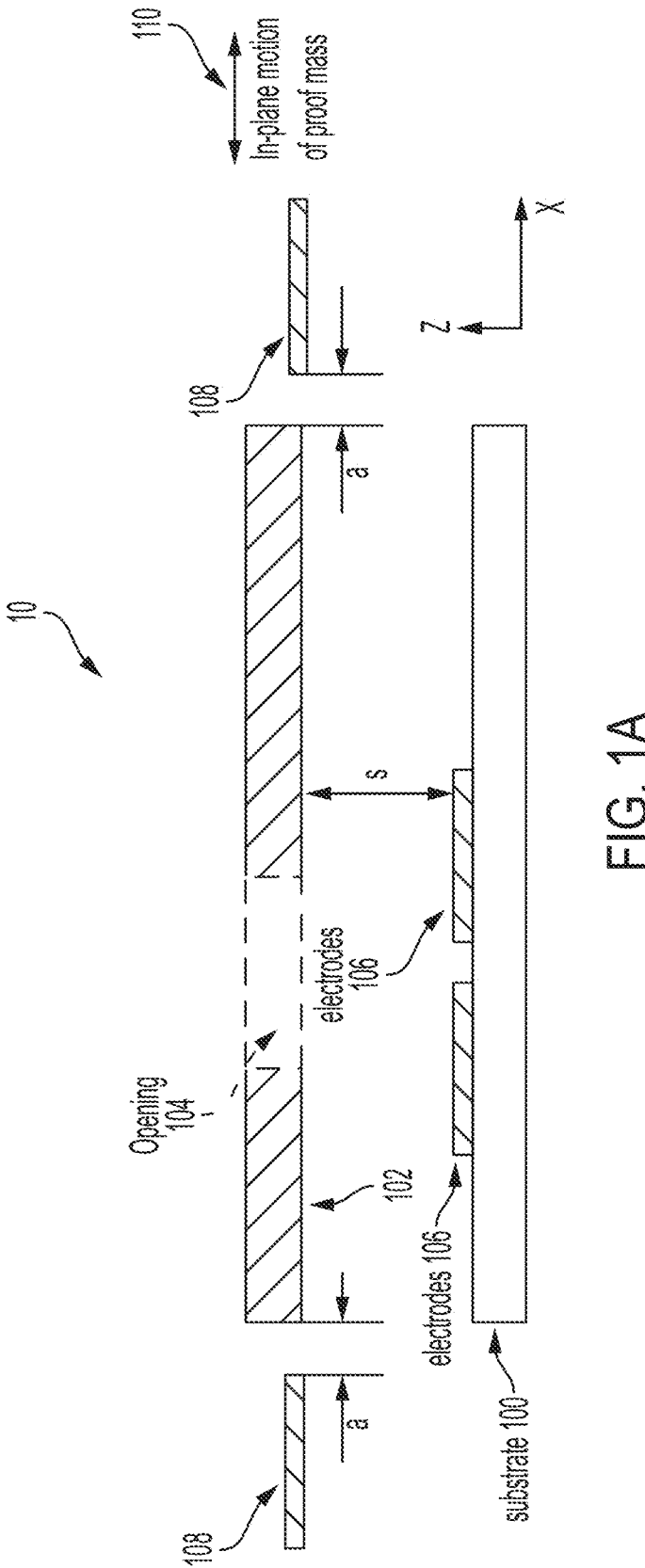
FIG. 1A illustrates a cross-sectional view of a microelectromechanical systems (MEMS) yaw gyroscope with out-of-plane quadrature trim electrodes, in accordance with some embodiments.

Aspects of the present technology include quadrature trim electrode configurations for microelectromechanical systems (MEMS) yaw gyroscopes, in which the quadrature trim electrodes are positioned out-of-plane from the gyroscope proof mass. The proof mass may be a planar proof mass configured to be driven in-plane. A controller may be configured to apply an alternating current (AC) voltage to at least one drive electrode to drive the proof mass in-plane. The proof mass may include openings. Quadrature trim electrodes may be positioned out-of-plane from the proof mass in a way in which a projection of the quadrature trim electrodes into the plane of the proof mass overlaps with edges of the openings in the proof mass. A direct current (DC) voltage may be applied to the quadrature trim electrodes, creating a force that acts on the edges of the proof mass at the proof mass openings. The controller may be further configured to apply the DC voltage to the out-of-plane quadrature trim electrodes. The force may trim the proof mass in one or two in-plane directions. For example, both x-direction and y-direction quadrature trimming may be achieved.

The proof mass may be configured to be driven in-plane for determining a yaw rate, an angular velocity about the vertical axis (e.g., parallel to the z-axis). Detecting angular motion about the vertical axis involves driving the proof mass in-plane along a first axis (referred to herein as the drive mode) and detecting in-plane motion along a second axis (referred to herein as the sense mode). Driving the proof mass in-plane may induce motion in the yaw gyroscope, causing the proof mass to vibrate in a periodic fashion. When the proof mass of the yaw gyroscope oscillates and the yaw gyroscope is subjected to angular motion, a Coriolis effect, and hence a Coriolis force, arises that can be sensed. In some embodiments, the proof mass may be driven to oscillate in the x-axis direction and the proof mass may undergo angular motion about the vertical axis, generating a Coriolis force directed in the y-direction. In these embodiments, the Coriolis force may be sensed by sensing in-plane motion of the proof mass in the y-direction.

Trimming may be used in yaw gyroscopes to compensate for undesired effects arising due to quadrature motion. Imperfections caused during fabrication (e.g., slanted sidewalls) can contribute to quadrature motion of the proof mass. Quadrature motion arises when a proof mass, despite being driven to oscillate in-plane solely along one direction (e.g., the x-direction), undergoes undesired motion in another direction as well (e.g., the y-direction), leading to crosstalk. The quadrature motion can be erroneously interpreted by an electronic circuit coupled to the yaw gyroscope as an angular velocity. Recognizing the desire to eliminate and compensate for crosstalk arising due to fabrication-caused imperfections, Applicant has developed yaw gyroscopes that limit or eliminate entirely quadrature motion. The MEMS yaw gyroscopes according to aspects of the present application utilize quadrature trim electrodes. Quadrature trim electrodes may be arranged to produce an electrostatic force that biases the position of a proof mass in a direction and by an amount that compensates the gyroscope for quadrature motion.

Certain gyroscopes rely on in-plane quadrature trim electrodes (quadrature trim electrodes positioned in the same plane in which the proof mass lies) that are aligned in one axis relative to one another. Such a configuration can result in small gaps between the in-plane quadrature trim electrodes and the proof mass, therefore limiting proof mass motion in-plane. Limiting the proof mass motion limits the sensitivity of the gyroscope to angular motion. Bigger gaps to allow for higher proof mass amplitude motion can be used, but bigger gaps can result in quickly decreasing quadrature trim strength, making the gyroscope more susceptible to crosstalk.

In contrast, aspects of the present technology provide symmetric electrode pattern configurations for quadrature trimming, in which the force on the proof mass depends on a vertical gap (e.g., a gap with respect to the z-axis) between the substrate and the moving proof mass, thus not interfering with the direction and large amplitude of proof mass motion. In-plane force for biasing the position of the proof mass to counteract quadrature motion can be produced by operating out-of-plane trim electrodes (quadrature trim electrodes positioned in a plane different from the plane in which the proof mass lies) in conjunction with openings formed in the proof mass. A projection of the quadrature trim electrodes into the plane of the proof mass overlaps with edges of the openings in the proof mass. Thus, application of a DC voltage to the quadrature trim electrodes results in a force that acts on the edges of the proof mass at the proof mass openings, thereby biasing the position of the proof mass.

In some embodiments, the trim electrodes are closely spaced relative to each other to avoid charging of exposed dielectric between them. The electrodes may form a periodic pattern with a repeated elementary square cell that consists of four squares. Two diagonal squares of this elementary pattern cell may have the same control voltage and two other diagonal squares may have the opposite sign voltage. The proof mass may be separated from the quadrature trim electrodes by a stable small vertical gap. Holes may be provided in the proof mass nominally aligned with the center of elementary electrode cell. As the proof mass moves under resonant excitation, the holes in the proof mass change position relative to a static electrode pattern on a substrate. The change in area overlap between the four electrodes of the elementary cell and the proof mass hole creates cross axis force, orthogonal to the direction of proof mass motion.

Accordingly, aspects of the present technology provide out-of-plane quadrature trim electrodes for trimming in-plane motion of a MEMS yaw gyroscope. The out-of-plane quadrature trim electrodes are separated vertically from the proof mass of the gyroscope, which is configured to be driven in-plane. The vertical spacing between the vertical quadrature trim electrodes and the proof mass may remain substantially constant during in-plane motion of the proof mass. In response to experiencing rotation about the vertical axis, the proof mass moves in an in-plane direction, which is detected by sense electrodes positioned in the same plane as the proof mass.

The aspects and embodiments described above, as well as additional aspects and embodiments, are described further below. These aspects and/or embodiments may be used individually, all together, or in any combination of two or more, as the application is not limited in this respect.

II. Out-of-Plane Quadrature Trim Electrodes

FIG. 1A illustrates a cross-sectional view of a MEMS yaw gyroscope 10 with out-of-plane quadrature trim electrodes 106, according to a non-limiting embodiment. The MEMS yaw gyroscope 10 includes a planar proof mass 102, a substrate 100, and quadrature trim electrodes 106.

The planar proof mass 102 is suspended above the substrate 100. For example, the planar proof mass 102 may be coupled to the substrate 100 by tethers, an anchor, or a combination of supporting structures. The planar proof mass 102 is suspended such that it can move in-plane in two dimensions (e.g., the x-direction and y-direction), and optionally it can move out-of-plane (in the z-direction in the figure) in response to roll or pitch rotation of the gyroscope. Drive electrodes 108 may be provided in-plane with the proof mass 102 to drive the proof mass (e.g., via application of a suitable alternating current (AC) drive signal). In the cross-sectional view of FIG. 1A, two drive electrodes 108 are visible. However, more may be provided, and in a non-limiting embodiment, four drive electrodes may be provided in-plane with proof mass 102 with one on each side of proof mass 102. Drive electrodes 108 may be offset from proof mass 102 by the distance labeled "a" in FIG. 1A. In some embodiments, the distance labeled "a" between the proof mass 102 and the drive electrodes 108 does not limit the range of motion of the proof mass too significantly. The drive electrodes 108 may have, among other shapes, a rectangular shape. The proof mass 102 is shown in rectangular form, but may have any suitable size and shape, and may be formed of any suitable material(s).

The proof mass 102 includes an opening 104. In some embodiments, the proof mass includes multiple openings, such as an array of openings. However, a single opening 104 is shown in FIG. 1A for simplicity of illustration. The opening 104 may be square or rectangular (when viewed in the z-direction), although alternative shapes may be used in alternative embodiments. The opening 104 may be sized to provide sufficient surface area of the inner edges of the opening 104 to experience a trimming force from the out-of-plane quadrature trim electrodes 106.

As shown in FIG. 1A, the MEMS yaw gyroscope 10 includes a plurality of quadrature trim electrodes 106 disposed on the substrate 100. The quadrature trim electrodes 106 are therefore separated from the proof mass 102 in the z-direction, and are referred to as out-of-plane quadrature trim electrodes because they lie outside the plane of the proof mass 102. The quadrature trim electrodes 106 may be separated from the proof mass 102 by the distance labeled "s" in FIG. 1A. In the cross-sectional view of FIG. 1A, two quadrature trim electrodes 106 are visible. However, more may be provided, as will be described with respect to subsequent figures.

Notably, in-plane movement of the planar proof mass 102, as occurs when the proof mass 102 is driven, may not alter the vertical distance between the proof mass 102 and the quadrature trim electrodes 106. Such a configuration simplifies control of the quadrature trim electrodes 106 during operation of the MEMS yaw gyroscope 10. By not changing the spacing between the proof mass 102 and the quadrature trim electrodes 106, the force exerted on the proof mass 102 by the quadrature trim electrodes 106 may be better controlled than if the quadrature trim electrodes 106 were positioned in a manner in which there was a variable gap between them and the proof mass 102 (as is the case for in-plane quadrature trim electrodes).

Figure 1B:
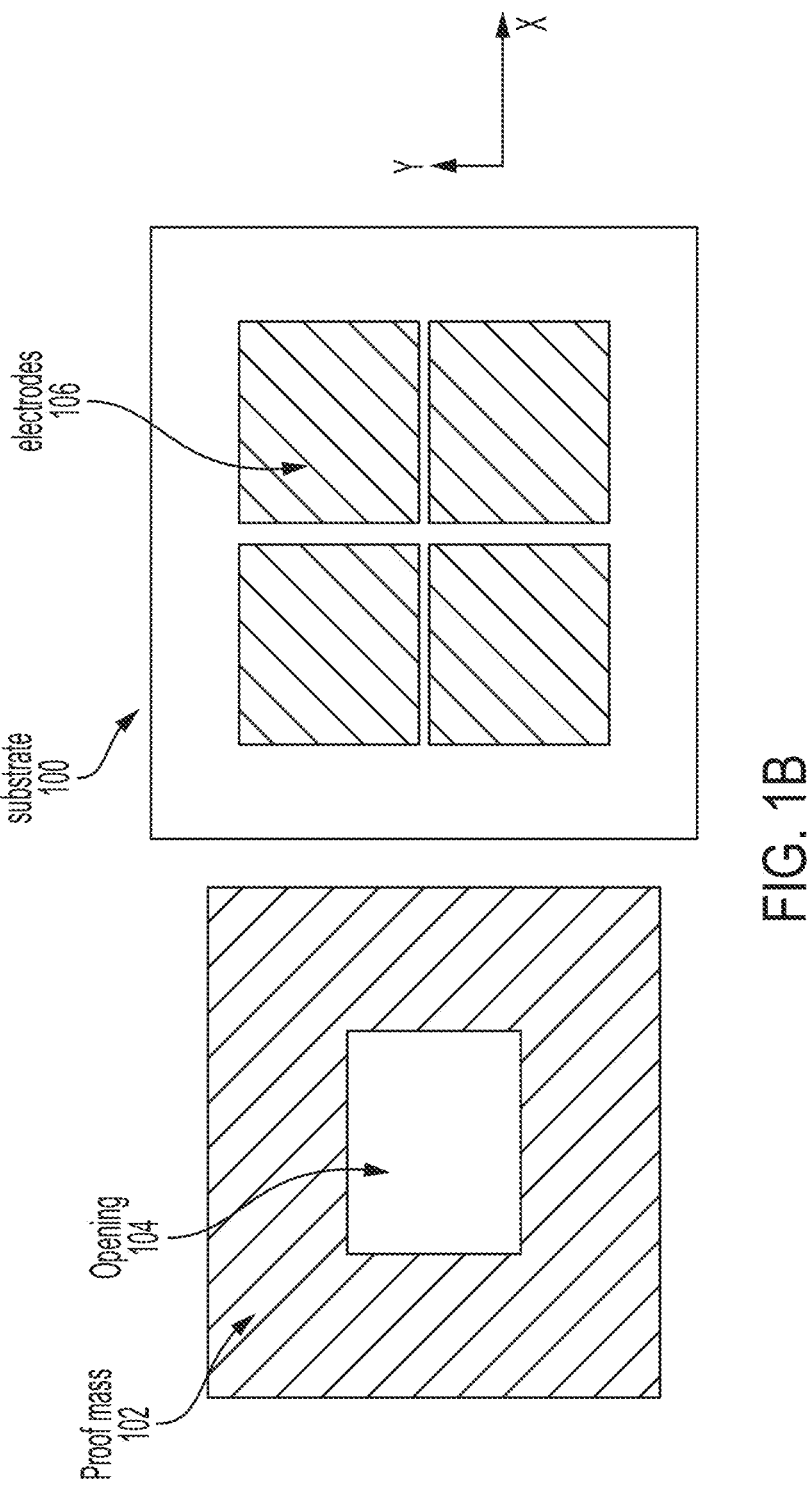
FIG. 1B illustrates the substrate and the proof mass of FIG. 1A in a top-down, side-by-side view, in accordance with some embodiments.
Figure 1C:
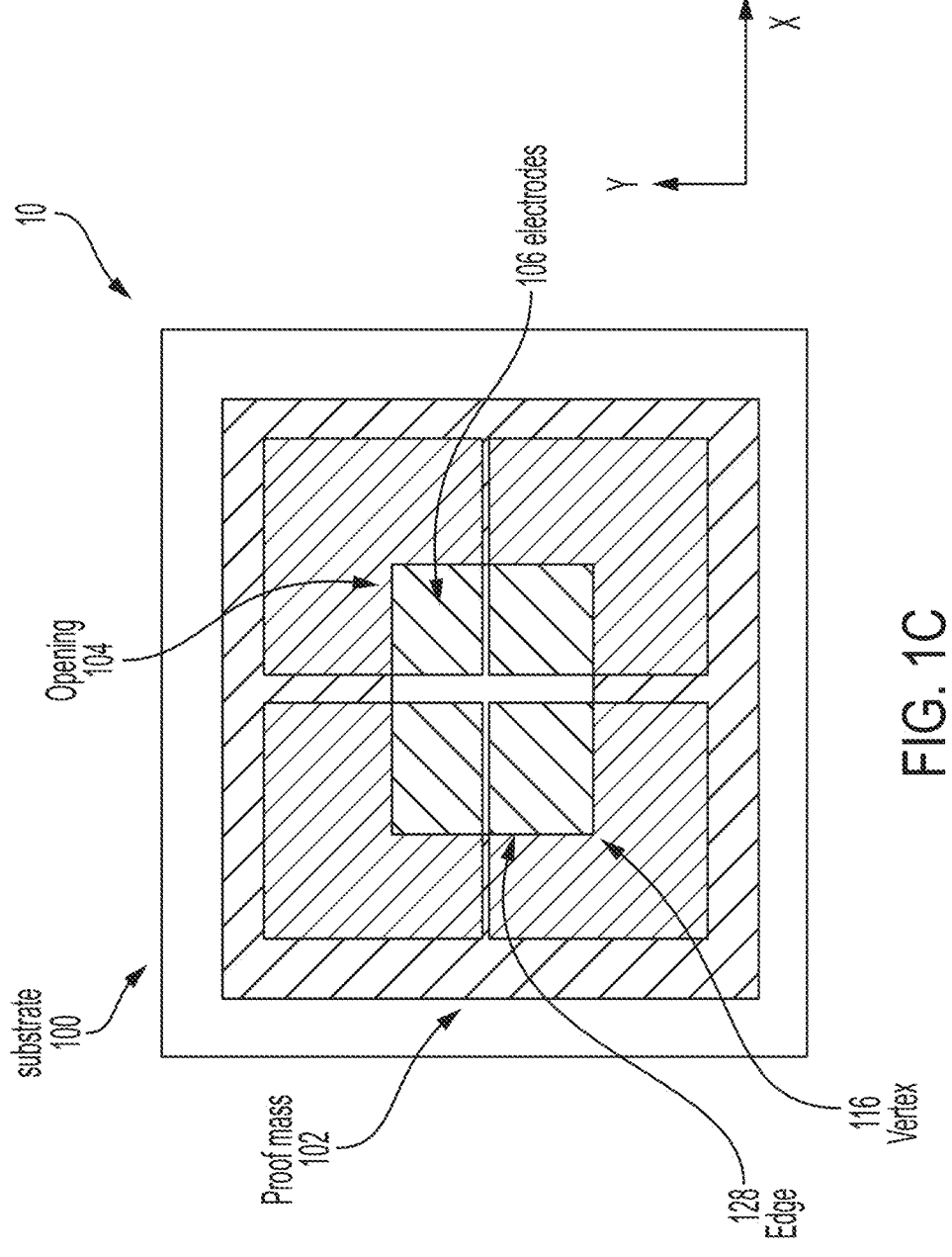
FIG. 1C shows a top-down view of the structure of FIG. 1A, in accordance with some embodiments.
Figure 2:
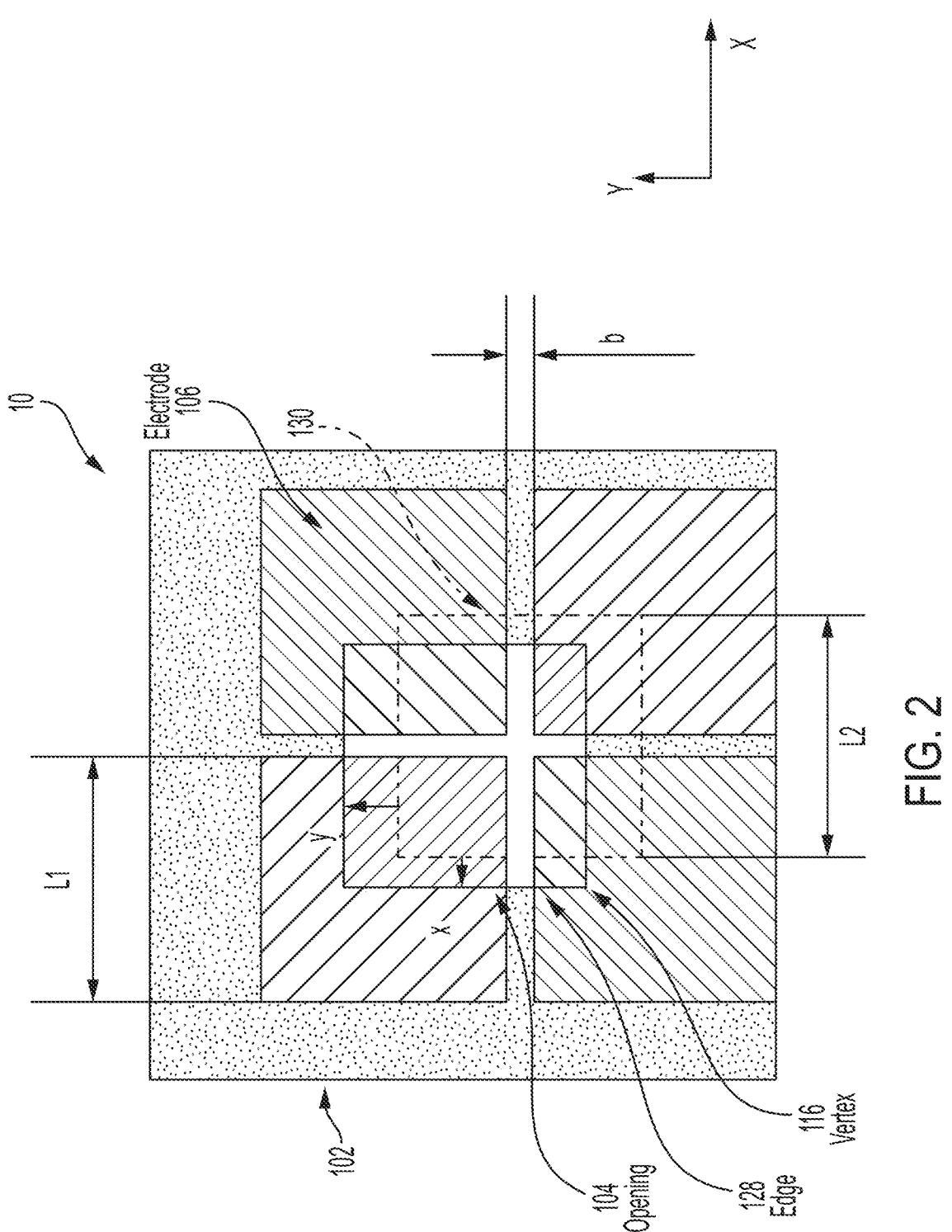
FIG. 2 illustrates quadrature trim electrodes provided in pairs, as illustrated by the different shades, in accordance with some embodiments.

FIG. 1B illustrates the substrate 100 and the proof mass 102 of FIG. 1A in a top-down, side-by-side view. It should be appreciated that the two are side-by-side for convenience of illustration, and that in practice the proof mass 102 is over the substrate 100, as can be seen in FIG. 1C. As seen in FIG. 1C, which is a top-down view of the structure of FIG. 1A, the proof mass 102 and out-of-plane quadrature trim electrodes 106 are positioned so that the out-of-plane quadrature trim electrodes 106 laterally overlap (with respect to the xy-plane) the opening 104 in the proof mass 102. In some embodiments, a projection of the out-of-plane quadrature trim electrodes 106 into the plane of the proof mass overlaps the edges of the opening 104. The quadrature trim electrodes 106 and the opening 104 of the proof mass 102 can be sized so that there is overlap even when the proof mass 102 moves to its maximum in-plane extent during operation. FIG. 2, described further below, illustrates this feature as well.

The configuration of FIG. 1C allows for in-plane quadrature trimming of the proof mass 102 using out-of-plane quadrature trim electrodes 106. Applying a DC voltage to the quadrature trim electrodes 106 will generate an electric field having an in-plane component that acts on edges 128 (which are shown in FIG. 1C as the inner edges of the opening 104 of the proof mass 102). As shown in FIG. 1C, each edge 128 of the opening 104 meets another edge 128 at a vertex 116. The in-plane component of the electric field results in a force being applied at the edges 128 of the opening 104. The force can be directed in the x-direction and/or the y-direction and may be an in-plane force.

Referring to FIG. 2, the quadrature trim electrodes 106 and the opening 104 of the proof mass 102 can be sized so that there is overlap even when the proof mass 102 moves to its maximum in-plane extent during operation. The dashed box 130 represents the positioning of the proof mass opening 104 at equilibrium (e.g., at rest). The distance labeled "L1" indicates a dimension of the quadrature trim electrodes 106 and the distance labeled "L2" indicates a dimension of the proof mass 102 in the same direction, the x-direction. As shown in FIG. 2, the quadrature trim electrodes are each separated by a spacing labeled "b." As shown, the opening 104 may displace in the x and y-directions by an amount "x" and "y" respectively. When displaced, the opening 104 still overlies the quadrature trim electrodes 106, such that each vertex 116 continues to overlap a respective quadrature trim electrode 106.

FIG. 2 also illustrates that the quadrature trim electrodes 106 can be provided in pairs, as illustrated by the different shading. The pairs relate to the application of a voltage differential. For example, electrodes positioned diagonally relative to each other may be electrically tied together. The pairs may be positioned perpendicularly relative to each other. Providing both pairs of electrodes positioned as shown allows for trimming in both the x and y-directions. Providing a single pair would allow for trimming in a single direction, either the x-direction or the y-direction. The electrodes are laterally positioned along two dimensions to provide for quadrature trim in two in-plane dimensions.

Figure 3:
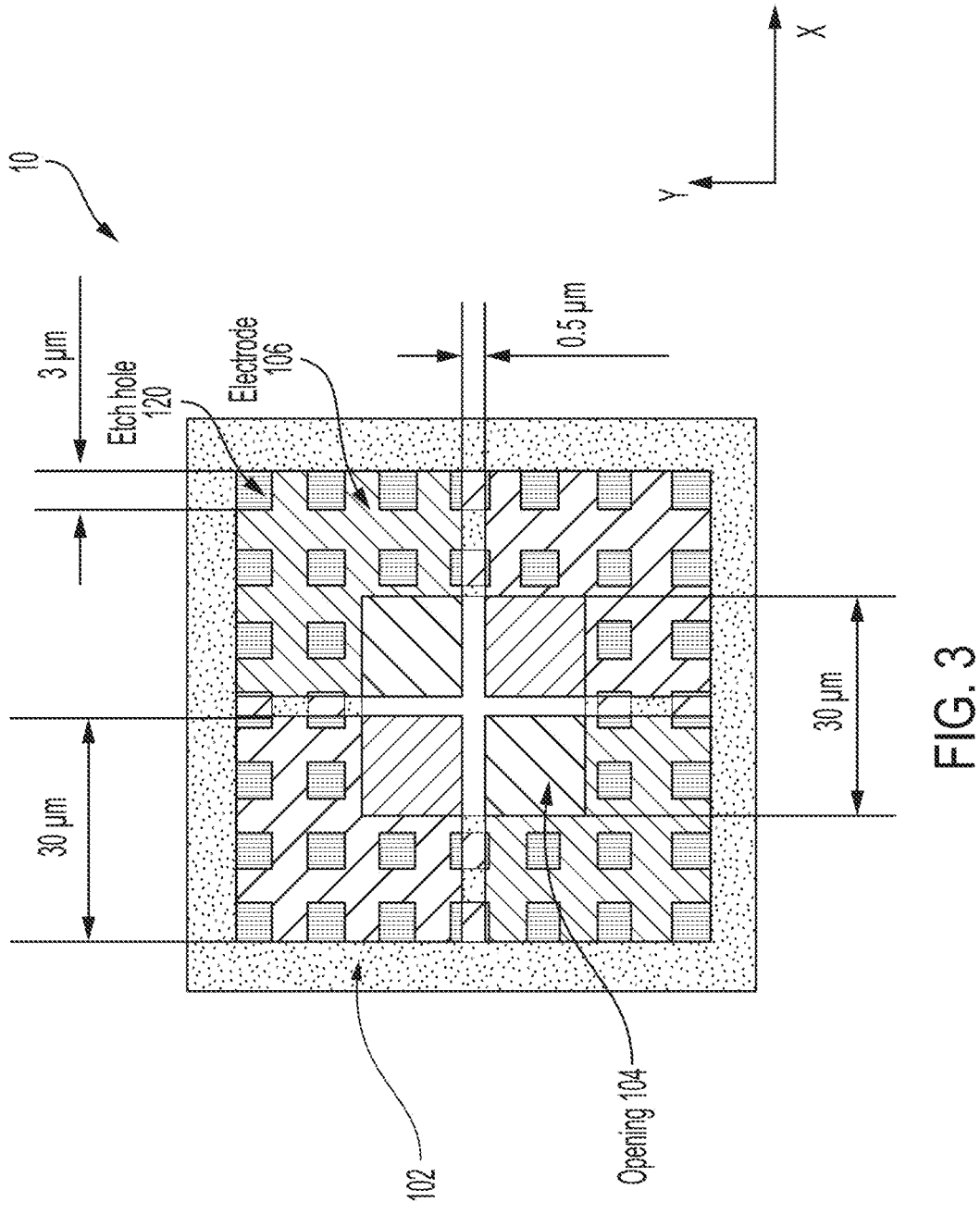
FIG. 3 illustrates examples of dimensions for the structure of FIG. 2, in accordance with some embodiments.

FIG. 3 illustrates examples of dimensions for the structure of FIG. 2. The illustrated dimensions are non-limiting examples, as other dimensions may be used. That said, as illustrated, the opening 104 may be significantly larger than the in-plane spacing between the quadrature trim electrodes (e.g., spacing labeled "b" in FIG. 2). The opening 104 may be a comparable size to each individual quadrature trim electrode 106 in some embodiments. As shown in FIG. 3, the distance labeled "L1" in FIG. 2 may be approximately 30 μm and is larger than the spacing labeled "b" which may be 0.5 μm. The distance labeled "L1" may be a value between 25 and 35 μm, between 20 and 40 μm, or any value within those ranges. Similarly, the distance labeled "L2" may be a value between 25 and 35 μm, between 20 and 40 μm, or any value within those ranges. The spacing labeled "b" between adjacent electrodes may be between 0.1 to 5.0 μm, 0.1 to 1.0 μm, or any value within those ranges. As shown in FIG. 3, proof mass 102 may have etch holes 120, formed for fabrication purposes. Each etch hole 120 may have a dimension of approximately 3 μm in one direction, a dimension between 1.0 to 5.0 μm, or a value within that range. While FIG. 3 shows a single proof mass 102 with an opening 104, in a non-limiting embodiment, proof mass 102 may comprise interconnected masses configured to define an opening.

Thus, according to an aspect of the present technology, a MEMS gyroscope may include a substrate (e.g., substrate 100) and a planar proof mass (e.g., proof mass 102) suspended above the substrate. In some embodiments, being "above" entails being in a position offset with respect to a vertical axis, and can also include a situation in which the device is rotated relative to the y-axis (e.g., is flipped over). The proof mass may have an enclosed opening (e.g., opening 104). For example, the opening may be surrounded by material of the proof mass. The MEMS gyroscope may include out-of-plane quadrature trim electrodes (e.g., quadrature trim electrodes 106) on the substrate. Quadrature trim electrodes 106 are separated from proof mass 102 in a direction perpendicular to the top surface of the proof mass. The quadrature trim electrodes may be laterally positioned to overlap interior edges (e.g., edges 128) of the proof mass at the opening. For example, each vertex of the opening may overlap with a respective electrode. To overlap may entail a portion of each being covered by the other in a dimension.

Figure 7A:
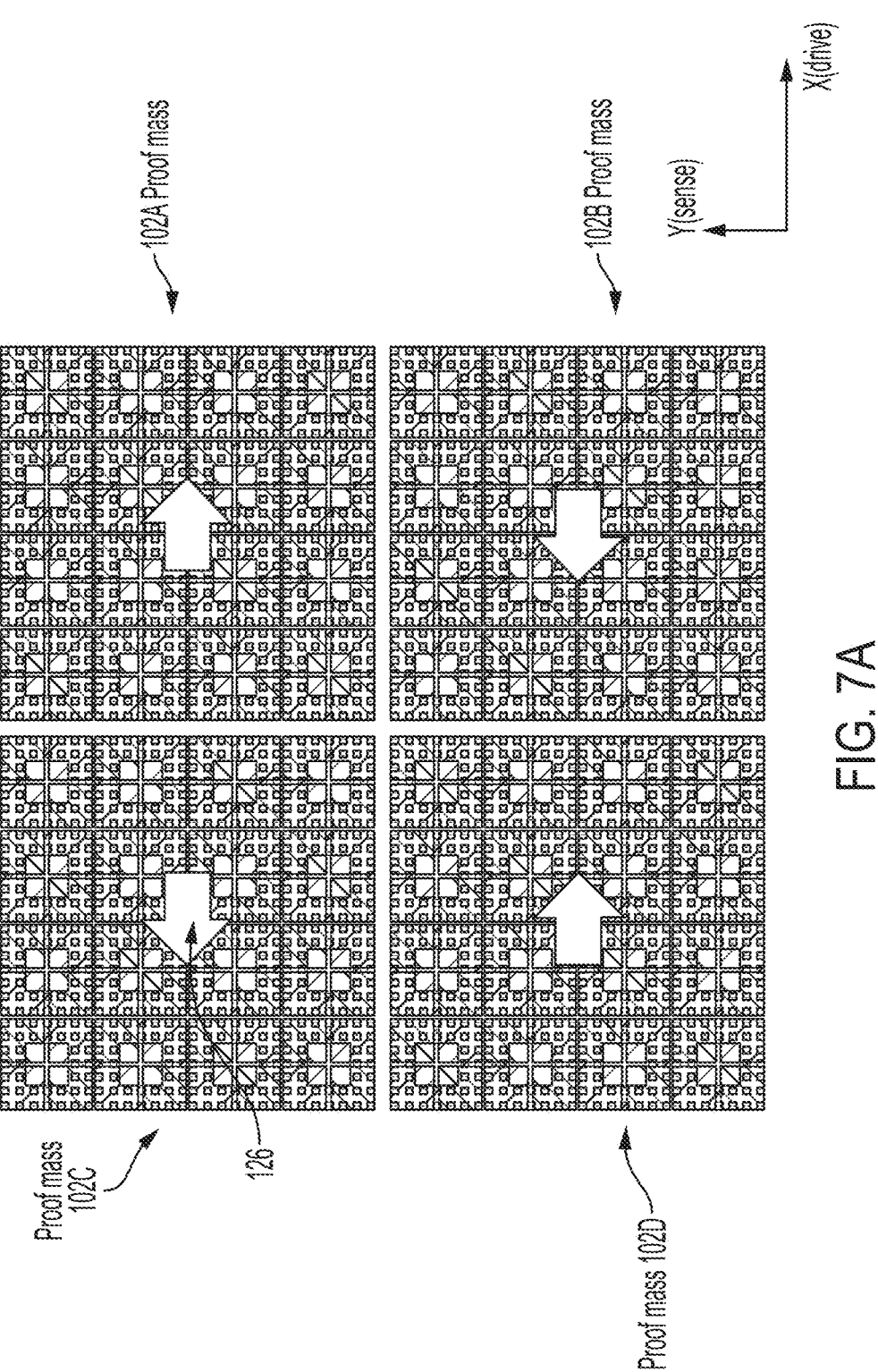
FIG. 7A shows four masses of a quadrature mass gyroscope, in accordance with some embodiments.

III. Use of Out-of-Plane Quadrature Electrodes in Multi-Proof Mass Gyroscopes It should be appreciated that not all embodiments are limited to one proof mass, since gyroscopes of the type described herein may include any other suitable number of proof masses. In one example, a gyroscope may have four proof masses positioned in four respective quadrants. With four proof masses, the gyroscope may operate in an anti-phase manner in both drive and sense modes in which one proof mass moves in the negative x-direction and an adjacent proof mass moves in the positive x-direction (e.g., as shown in FIG. 7A). Having four proof masses may improve accuracy due to the ability to sense angular motion differentially.

Figure 4:
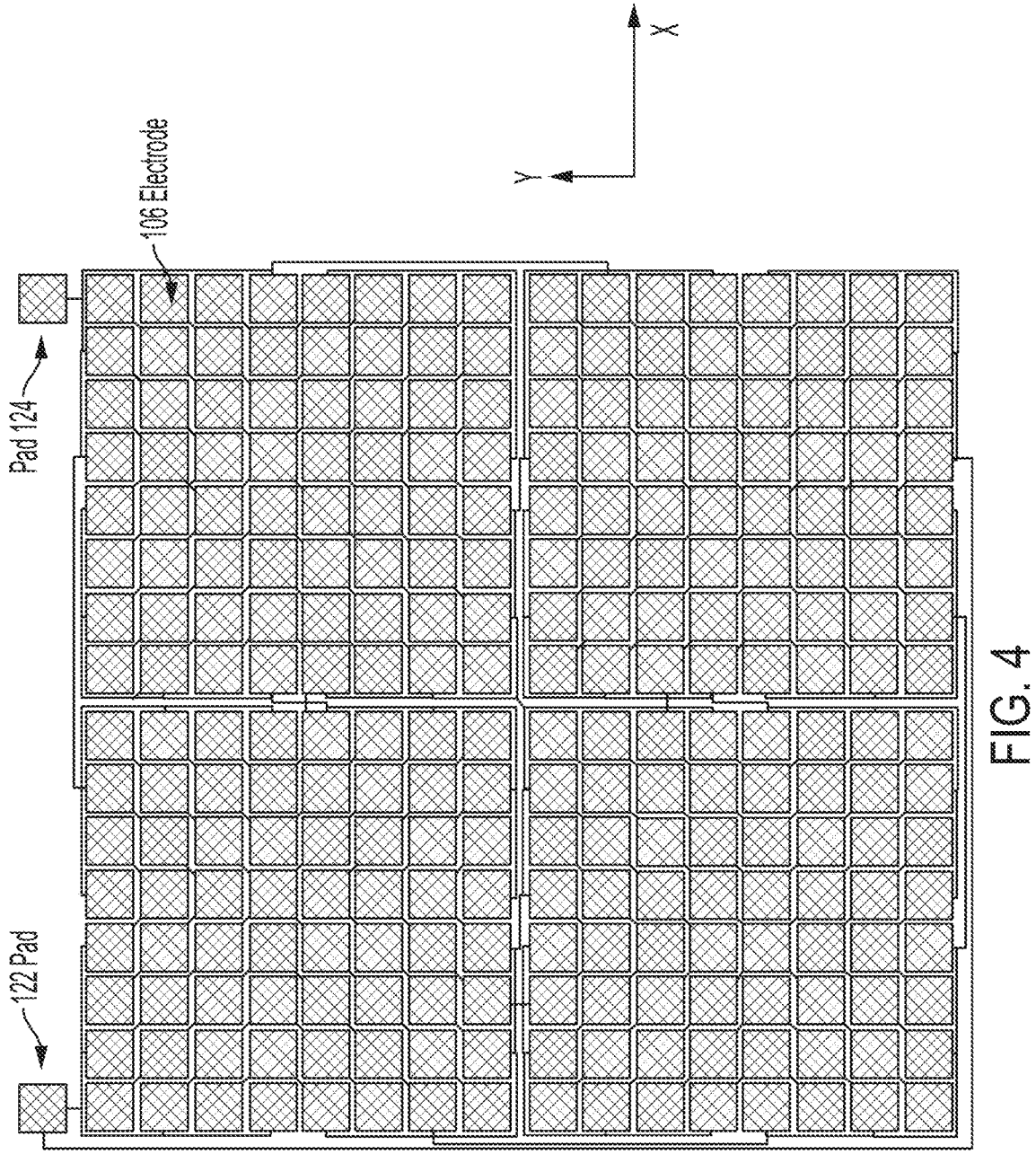
FIG. 4 illustrates an array of out-of-plane quadrature trim electrodes, in accordance with some embodiments.
Figure 5:
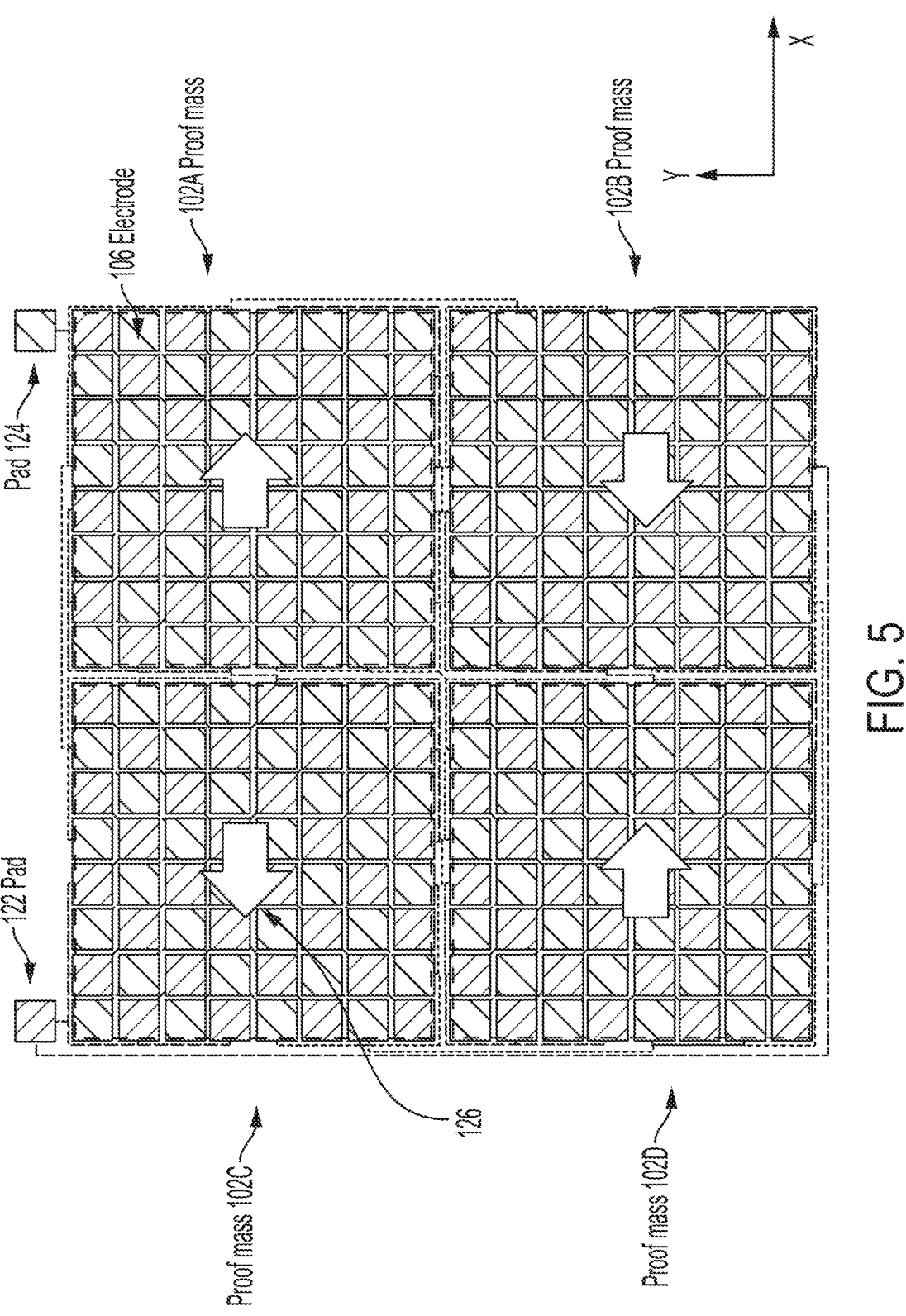
FIG. 5 shows the array of quadrature trim electrodes of FIG. 4 divided into two groups that are electrically separate, in accordance with some embodiments.

FIG. 4 illustrates an array of out-of-plane quadrature trim electrodes 106. In some embodiments, tens or hundreds of quadrature trim electrodes 106 are provided. Two pads, pad 122 and pad 124, are provided to afford electrical access to the quadrature trim electrodes 106. That is, the array of quadrature electrodes 106 may include a first subset electrically connected to a first pad, and a second subset electrically connected to a second pad. FIG. 5 further illustrates this feature. The first and second groups may have multiple pairs of electrodes. The first group and the second group may be configured to receive two different voltages. Multiple electrode sets, such as the array of out-of-plane quadrature trim electrodes 106 shown in FIG. 4, can be used to improve the lateral force without increasing the applied voltage. Applicant has appreciated that the largest voltage that can be applied to the trim electrodes is dictated by the nature of the application-specific integrated circuit (ASIC) driving the electrodes. For example, certain ASICs do not permit generation of voltage in excess of 40 V (or between 30 to 50 V). To provide sufficient force to compensate a gyroscope for quadrature motion despite the limited voltage that can drive the trim electrodes, an array of out-of-plane quadrature trim electrodes 106 may be used in conjunction with multiple openings in the proof mass. Each set of four electrodes may exert a force on the edges of a corresponding opening. As a result, the overall force applied to the proof mass is the combination of the forces applied to the individual openings. Unfortunately, providing multiple openings presents a drawback: because the amount of material carved out from the proof mass is increased, sensitivity to angular motion may be reduced.

As shown in FIG. 5, the array of quadrature trim electrodes 106 can be divided into two groups that are electrically separate. In this non-limiting example, the two groups are arranged in a checkerboard pattern. The first group are electrically connected to each other, and the second group are electrically connected to each other. The array may be divided into four quadrants. As shown in FIG. 5, each quadrant corresponds to an out-of-plane proof mass 102A, 102B, 102C, and 102D (e.g., proof mass 102 in FIG. 6) covering respective quadrature trim electrodes 106. The outline of each proof mass (positioned in a plane above electrodes 106) is illustrated with dashed lines. Arrows 126 show which direction proof mass 102A, 102B, 102C, and 102D are driven in-plane. In this case, the masses are driven along the x-axis in an anti-phase manner.

Figure 6:
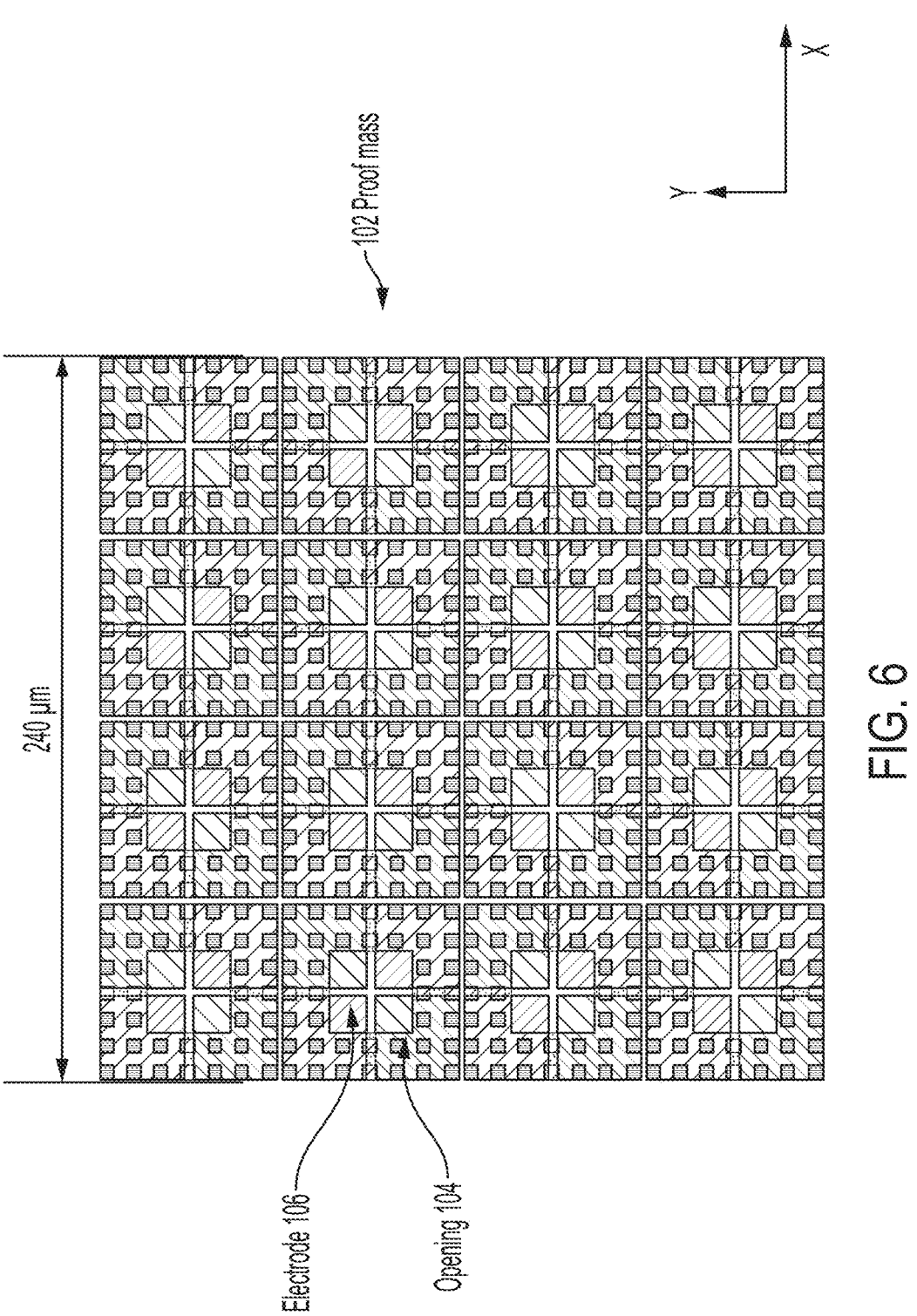
FIG. 6 illustrates a configuration of a single quadrant of a gyroscope overlying a partial array of quadrature trim electrodes, in accordance with some embodiments.

FIG. 6 illustrates an example configuration of a single quadrant of a proof mass 102 overlying a partial array of quadrature trim electrodes 106. In this example, there are sixteen square openings 104 in the proof mass 102, and thirty-two pairs of quadrature trim electrodes 106 underlying the openings 104. Stated another way, FIG. 6 illustrates an 8×8 array of out-of-plane quadrature trim electrodes 106 for a single proof mass 102 of a quadrature mass gyroscope. Each set of four electrodes of the array may be laterally positioned to overlap edges of a corresponding opening, similar to the arrangement described in connection with FIG. 1C. FIG. 6 illustrates that one dimension for the proof mass 102 is approximately 240 μm, in accordance with one example.

FIG. 7A expands on FIG. 6 by showing four masses 102A, 102B, 102C, and 102D of a quadrature mass gyroscope. That is, FIG. 7A illustrates four instances of the structure of FIG. 6. As shown in FIG. 7A, an X-Y axis is shown as an indicator of direction and in particular, an indicator of which direction is for sensing in-plane motion and which direction is for driving in-plane motion of proof mass 102A, 102B, 102C, and 102D, according to a non-limiting embodiment. Arrows 126, representing the drive mode, are shown as pointing in a direction along the x-axis in FIG. 7A.

It should be noted that gyroscopes of the types described herein may be shaped to support mode switching, whereby the direction of the drive mode and the direction of the sense mode are swapped. Allowing a gyroscope to perform mode switching may be useful in some applications. In some embodiments, mode switching may be enabled by the symmetric nature of the gyroscope in the plane of the proof masses.

Figure 7B:
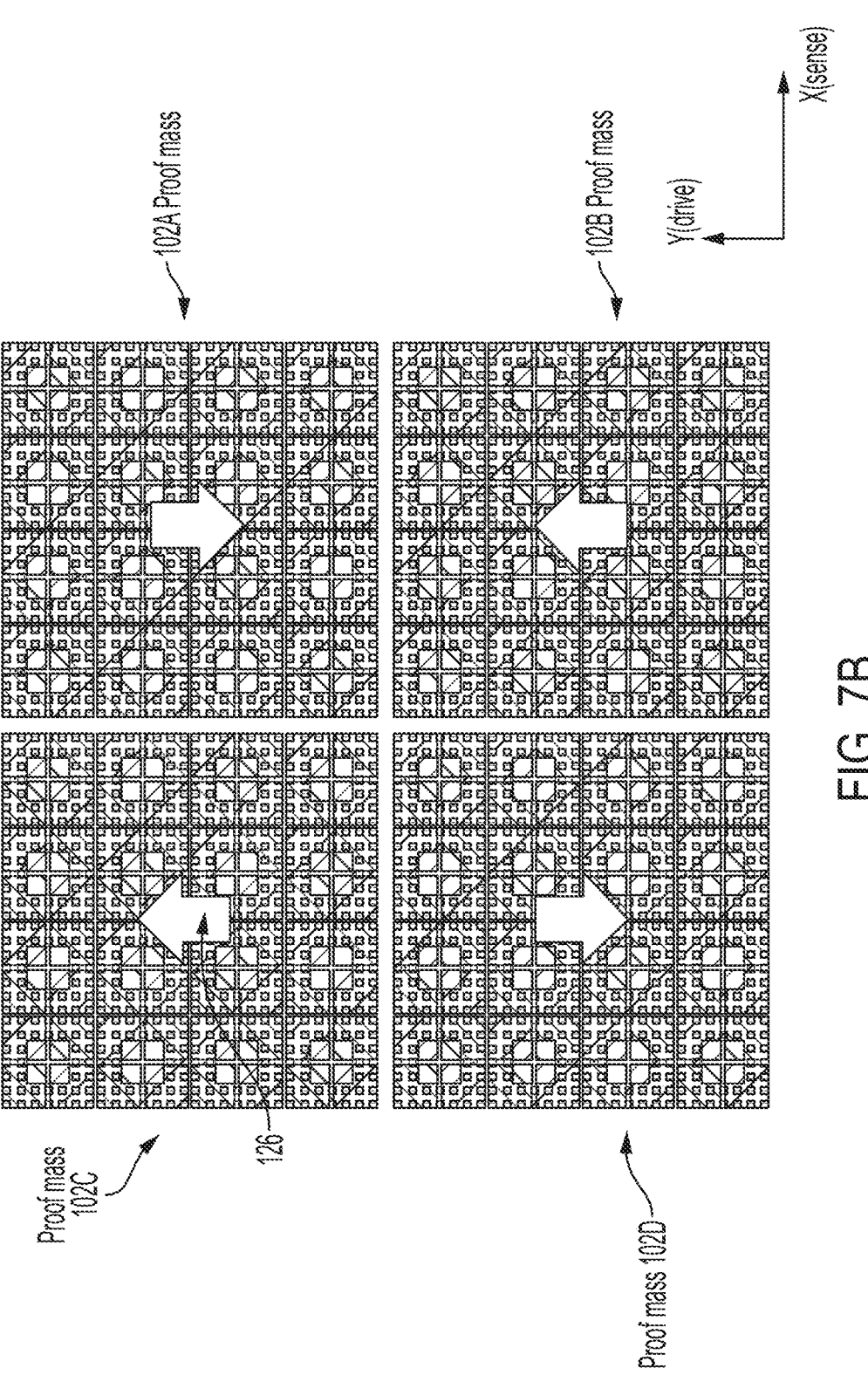
FIG. 7B shows four masses of a quadrature mass gyroscope with a different drive mode than the structure of FIG. 7A, in accordance with some embodiments.

FIG. 7B shows the gyroscope of FIG. 7A upon undergoing mode switching. As shown in FIG. 7B, the X-Y axis indicates the x-direction is for sensing motion and the y-direction is for driving motion of proof mass 102A, 102B, 102C, and 102D. In this case, arrows 126, representing the drive mode, are shown as pointing in a direction along the y-axis. In some embodiments, the out-of-plane quadrature trim electrodes limit quadrature motion when the system is in a first mode, driving the proof mass along the x-axis as shown in FIG. 7A, or in a second mode, driving the proof mass along the y-axis as shown in FIG. 7B. Mode switching can occur without affecting the gyroscope's ability to achieve trimming in part because the quadrature trim electrodes are arranged symmetrically.

IV. Operation of Out-of-Plane Quadrature Electrodes

Figure 8:
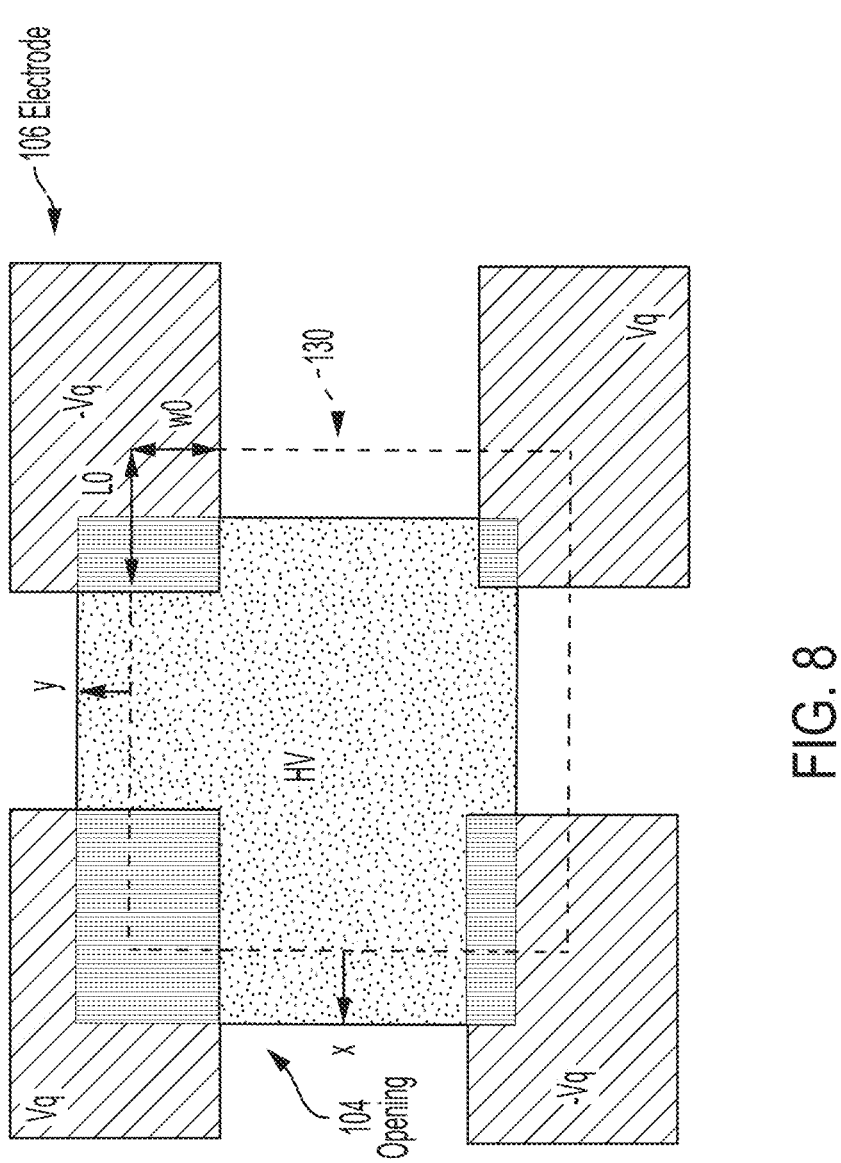
FIG. 8 illustrates a manner of operation of out-of-plane quadrature trim electrodes, in accordance with some embodiments.

FIG. 8 illustrates the manner of operation of the out-of-plane quadrature trim electrodes, in accordance with some embodiments. As shown in FIG. 8, quadrature trim electrodes 106 may overlap with an opening 104 of a proof mass and may be separated by a gap (not visible in FIG. 8). Box 130 represents the position of the opening when no voltage is applied to the electrodes.

The potential on the proof mass is at HV. The potentials on the out-of-plane quadrature trim electrodes 106 may be set to the same magnitude $V_q$ but on the diagonals, with different signs. The initial overlap between the out-of-plane quadrature trim electrodes 106 and the opening 104 is represented by segments L0 and w0. Opening 104 moves by distances x and y from the initial position in response to trimming.

The capacitance arising between the out-of-plane quadrature trim electrodes 106 and the proof mass can be estimated. Here, $\varepsilon_0$ represents the permittivity of free space or the dielectric constant. L0 and w0 represent the dimensions of the overlap between the opening of the proof mass and the electrode initially. The term gap represents the gap between the electrodes and the proof mass out of plane. The capacitance estimates, $c_1$, $c_2$, $c_3$, and $c_4$ between the proof mass and the top left electrode, the top right electrode, the bottom right electrode, and the bottom left electrode, respectively, can be expressed as follows:

$$c_1(x, y) = \frac{\varepsilon_0}{\text{gap}} \cdot (L0 + x) \cdot (w0 + y)$$

$$c_2(x, y) = \frac{\varepsilon_0}{\text{gap}} \cdot (L0 - x) \cdot (w0 + y)$$

$$c_3(x, y) = \frac{\varepsilon_0}{\text{gap}} \cdot (L0 - x) \cdot (w0 - y)$$

$$c_4(x, y) = \frac{\varepsilon_0}{\text{gap}} \cdot (L0 + x) \cdot (w0 - y)$$

In embodiments in which the proof mass is driven along the y-axis, trimming may involve setting the electrical forces in the x-direction to be substantially equal to zero. With potential crosstalk, conditions to obtain zero force may need to be determined, such as by determining how much force to apply to the proof mass. Here, the electrical force in the x-direction is represented by $F_x$. The potential on the proof mass is at HV, and the potentials on the electrodes are $V_q$ (positive or negative, as shown in FIG. 8). The values to achieve a condition in which the electrical force in the x-direction is zero can be calculated with the following expressions:

$$F_x = \frac{-1}{2} \cdot \left[ \frac{d}{dx}(c_1(x, y) + c_3(x, y)) \cdot (HV - V_q)^2 + \right.$$
$$\left. \frac{d}{dx}(c_2(x, y) + c_4(x, y)) \cdot (HV + V_q)^2 \right]$$
$$F_x = \frac{4 \cdot HV \cdot V_q \cdot \varepsilon_0}{\text{gap}} \cdot y = q_{xy} \cdot y$$
$$q_{xy} = \frac{4 \cdot HV \cdot V_q \cdot \varepsilon_0}{\text{gap}}$$

Similarly, in embodiments in which the proof mass is driven along the x-axis, trimming may involve setting the electrical forces in the y-direction to be substantially equal to zero. Here, the electrical force in the y-direction is represented by $F_y$. When calculating $F_y$, the inner function of each derivative is the same as when calculating $F_x$, which allows for switching modes of driving and sensing. The values to achieve a condition in which the electrical force in the y-direction is zero can be calculated with the following expressions:

$$F_y = \frac{-1}{2} \cdot \left[ \frac{d}{dy}(c_1(x, y) + c_3(x, y)) \cdot (HV - V_q)^2 + \right.$$
$$\left. \frac{d}{dy}(c_2(x, y) + c_4(x, y)) \cdot (HV + V_q)^2 \right]$$
$$F_y = \frac{4 \cdot HV \cdot V_q \cdot \varepsilon_0}{\text{gap}} \cdot x = q_{yx} \cdot x$$
$$q_{yx} = q_{xy} = \frac{4 \cdot HV \cdot V_q \cdot \varepsilon_0}{\text{gap}}$$

V. Conclusion

According to an aspect of the present technology, a symmetric electrode pattern for trimming of quadrature is provided, that complements a variety of yaw axis Coriolis symmetrical gyroscope designs, including whole angle and mode switching. The symmetric electrode pattern preserves axial symmetry of yaw gyroscope and swapping of the axis of motion, without limiting proof mass displacement amplitude.

Yaw gyroscopes of the types described herein may be deployed in various settings to detect angular rates. One such setting is in automobiles such as self-driving cars, or in vehicles such as boats or aircrafts. Additional settings are industrial applications or in the defense industry. MEMS yaw gyroscopes may be used in any application in which angular rates are detected and reduced crosstalk is desired.

The aspects of the technology described above may provide various benefits. Some non-limiting examples of benefits are now described. It should be appreciated that not all embodiments provide all benefits, and that benefits other than those listed may be realized in at least some embodiments.

Aspects of the present technology provide quadrature trimming of a MEMS yaw gyroscope without limiting in-plane motion of the gyroscope's proof mass to accommodate the quadrature trim electrodes. Thus, the extent of the proof mass motion may be larger than if the quadrature trim electrodes were in-plane with the proof mass, while still providing effective quadrature trimming. Moreover, placement of the quadrature trim electrodes out-of-plane from the proof mass provides a constant (or substantially constant) gap distance between the proof mass and the quadrature trim electrodes even while driving the proof mass. Thus, the operation of the quadrature trim electrodes is not negatively impacted by changing gap distances as would occur if the quadrature trim electrodes were in-plane with the gyroscope proof mass. Use of out-of-plane quadrature trim electrodes for in-plane trimming also permits the use of simple shapes for the opening(s) in the proof mass. For example, the opening(s) may be a square, which facilitates simple microfabrication as compared to more complicated opening shapes that may be used with in-plane quadrature trim electrodes.

Alternatives to those features illustrated and explicitly listed herein are possible. For example, alternative shapes for the quadrature trim electrodes may be used. Polygons, hexagons, equilateral triangles, or other shapes that can be tessellated may be used as the quadrature trim electrode shape.

The terms "approximately," "substantially," and "about" may be used to mean±20% of a target value in some embodiments, within ±10% of a target value in some embodiments, within ±5% of a target value in some embodiments, and yet within ±2% of a target value in some embodiments. The terms "approximately," "substantially," and "about" may include the target value.

What is claimed is:

1. A microelectromechanical systems (MEMS) gyroscope, comprising:
   a substrate;
   a proof mass suspended above the substrate and comprising two or more enclosed openings; and
   two or more groups of out-of-plane quadrature trim electrodes on the substrate, individual ones of the two or more groups respectively corresponding to individual ones of the two or more enclosed openings, each group including at least one out-of-plane quadrature trim electrode, respective out-of-plane quadrature trim electrodes separated from the proof mass in a direction normal to the proof mass, wherein the out-of-plane quadrature trim electrodes in respective groups are laterally positioned to overlap interior edges of the proof mass at the respective corresponding openings.

2. The MEMS gyroscope of claim 1, wherein the proof mass comprises an array of openings and wherein the MEMS gyroscope comprises an array of out-of-plane quadrature trim electrodes laterally positioned to overlap interior edges of corresponding ones of the array of openings.

3. The MEMS gyroscope of claim 2, wherein the array of out-of-plane quadrature trim electrodes are arranged in a checkerboard pattern to receive two different voltages.

4. The MEMS gyroscope of claim 1, wherein the out-of-plane quadrature trim electrodes are laterally positioned along two dimensions to provide quadrature trim in two in-plane dimensions of the proof mass.

5. The MEMS gyroscope of claim 1, further comprising at least one drive electrode configured to drive in-plane motion of the proof mass in a first direction.

6. The MEMS gyroscope of claim 5, further comprising a controller configured to apply a direct current (DC) voltage to the out-of-plane quadrature trim electrodes and an alternating current (AC) voltage to the at least one drive electrode.

7. The MEMS gyroscope of claim 1, wherein a dimension of each of the out-of-plane quadrature trim electrodes is a value between 20 µm and 40 µm.

8. The MEMS gyroscope of claim 7, wherein a dimension of the enclosed opening is a value between 20 µm and 40 µm and a spacing between two adjacent electrodes of the out-of-plane trim electrodes is a value between 0.1 µm and 1.0 µm.

9. A microelectromechanical systems (MEMS) gyroscope, comprising:
   a planar proof mass suspended above a substrate;
   drive electrodes in-plane with the planar proof mass and configured to drive in-plane motion of the planar proof mass;
   a first pair of out-of-plane quadrature trim electrodes underlying a first opening in the planar proof mass and configured to apply an in-plane quadrature trim force to the planar proof mass at the opening; and
   a second pair of out-of-plane quadrature trim electrodes underlying a second opening in the planar proof mass and configured to apply an in-plane quadrature trim force to the planar proof mass at the opening.

10. The MEMS gyroscope of claim 9, wherein the planar proof mass comprises an array of openings including the opening and wherein the MEMS gyroscope comprises an array of out-of-plane quadrature trim electrodes including the pair of out-of-plane quadrature trim electrodes, the array of out-of-plane quadrature trim electrodes laterally positioned to overlap interior edges of the array of openings.

11. The MEMS gyroscope of claim 10, wherein the array of out-of-plane quadrature trim electrodes are arranged in a checkerboard pattern to receive two different voltages.

12. The MEMS gyroscope of claim 10, wherein the array of out-of-plane quadrature trim electrodes are laterally positioned along two dimensions to provide quadrature trim in two in-plane dimensions of the planar proof mass.

13. The MEMS gyroscope of claim 9, further comprising a controller configured to apply direct current (DC) voltages to the pair of out-of-plane quadrature trim electrodes and an alternating current (AC) voltage to the drive electrodes.

14. The MEMS gyroscope of claim 9, wherein a dimension of each of the out-of-plane quadrature trim electrodes of the pair of out-of-plane quadrature trim electrodes is a value between 20 µm and 40 µm.

15. The MEMS gyroscope of claim 14, wherein a dimension of the opening is a value between 20 µm and 40 µm and a spacing between the pair of out-of-plane trim electrodes is a value between 0.1 µm and 1.0 µm.

16. A method of operating a microelectromechanical systems (MEMS) yaw gyroscope having a planar proof mass with an opening suspended above a first pair of quadrature trim electrodes arranged along a first axis and a second pair of quadrature trim electrodes arranged along a second axis that is substantially perpendicular to the first axis, the method comprising:

generating an in-plane force at the opening of the planar proof mass in a first in-plane direction by applying a first direct current (DC) voltage to the first pair of quadrature trim electrodes;

generating an in-plane force at the opening of the planar proof mass in a second in-plane direction substantially perpendicular to the first in-plane direction by applying a second DC voltage to the second pair of quadrature trim electrodes;

driving in-plane motion of the planar proof mass along the first in-plane direction; and sensing angular motion of the MEMS yaw gyroscope by sensing in-plane motion of the planar proof mass along the second in-plane direction.

17. The method of claim 16, wherein driving in-plane motion of the planar proof mass comprises applying an alternating current (AC) drive signal to a pair of in-plane drive electrodes.

18. The method of claim 16, wherein applying the DC voltage to the first pair of quadrature trim electrodes comprises applying the DC voltage to a pad connected to a subset of an array of quadrature trim electrodes.

19. The method of claim 16, wherein driving in-plane motion of the planar proof mass does not substantially alter a gap between the planar proof mass and the pair of quadrature trim electrodes.

\* \* \* \* \*